G. C. TIMPE.

Elevators.

No. 5,870. Reissued May 12, 1874

Witnesses.

J. W. Mister

A. P. Berthrong.

Inventor.

Gustavus C. Timpe

Edson Bros.

Attorneys

AM. PHOTO-LITHOGRAPHIC Co. N. Y. (OSBORNE'S PROCESS.)

UNITED STATES PATENT OFFICE.

GUSTAVUS C. TIMPE, OF NEW ORLEANS, LOUISIANA.

IMPROVEMENT IN ELEVATORS.

Specification forming part of Letters Patent No. 118,301, dated August 22, 1871; reissue 5,870, dated May 12, 1874; application filed March 14, 1874.

*To all whom it may concern:*

Be it known that I, GUSTAVUS C. TIMPE, of New Orleans, in the parish of Orleans and State of Louisiana, have invented a new and useful Improvement in Elevators; and I do hereby declare that the following is a full, clear, and exact description thereof, reference being had to the accompanying drawing, in which—

Figure 1:
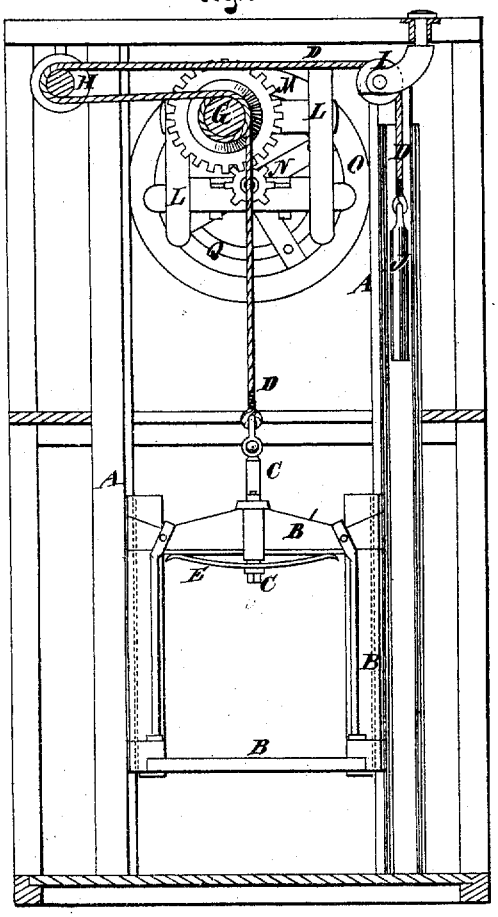
Figure 2:
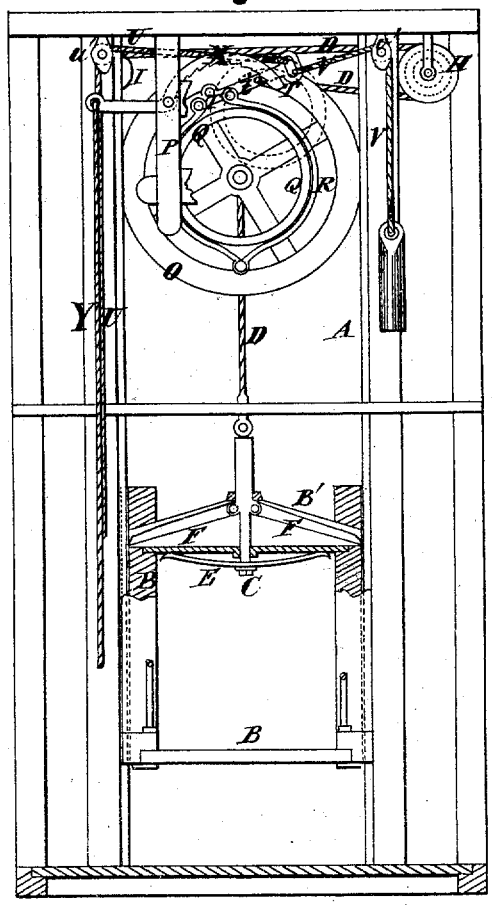
Figure 3:
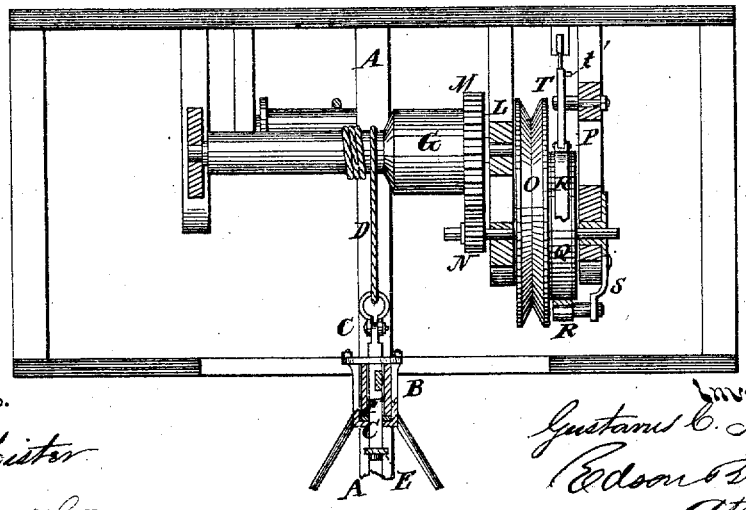

Figure 1 is a vertical cross-section of my improved elevator taken through the drum and idler. Fig. 2 is a side view of the same, parts being broken away to show the construction. Fig. 3 is a vertical section of the same taken longitudinally, with the drum and parts broken away to show the construction.

Similar letters of reference indicate like parts in the several figures.

My invention relates to such elevators as are used for hoisting in stores and other buildings; and my improvement consists in connecting the cage or platform with a counterpoise by a single continuous rope coiled around an intermediate drum, to which the power is applied, whereby one rope is enable to perform the work usually requiring two; and, also, in certain modifications in the details of construction, which will be hereinafter specially designated.

In the drawing, A represents the guide-posts or ways along which the cage or platform B moves up and down. C is a bar which passes down through the top cross-bar of the frame of the cage or platform B, and to the upper end of which is attached the hoisting-rope D. To the lower end of the bar C is attached the middle part of the spring E, the ends of which rest against the under side of the cross-bar through which the said bar C passes, and which may be plated to prevent it from being worn by the said spring E. To the sides of the bar C are pivoted the inner ends of two levers or pawls, F, the outer ends of which pass through holes in the ends of the cross-beam in which they work. By this construction should the rope break, or any of the mechanism give way, the elasticity of the spring E will instantly draw down the bar C, which will project the ends of the levers F against the ways A, holding the platform or cage securely in place, and holding it the more securely the heavier the load upon it. In case the ends of the levers F are to act upon wood their outer ends should be sharp; but, if desired, toothed racks may be attached to the ways A, in which case the outer ends of the levers F need not be made sharp. The rope D passes over and makes two or three turns around the drum G, around the drum or idler H pivoted to supports at one side of the hoistway, and over a pulley, I, swiveled at the other side of the hoistway, and to its end is attached a weight, J, which moves up and down through a well running down along one of the guide-posts A. The weight J keeps the rope D taut, and at the same time acts as a counterbalance to the cage or platform B. The swiveling of the pulley I allows the rope D to pass down vertically into the well in which the weight J moves, whatever direction the other part of said rope D may take. The drum G is made with an enlargement having an inclined shoulder, as shown in Fig. 3, to prevent the rope, when a manila rope is used, from getting out of line with the ways A when the platform or cage B approaches the said drum G. The journals of the drum G revolve in bearings in frames or brackets K L attached to the frame of the building or hoistway, as may be convenient. To one end of the drum is attached, or upon it is formed, a large gear-wheel, M, the teeth of which mesh into the teeth of the small gear-wheel N attached to the end of the journal of the grooved pulley or wheel O, around which passes the endless rope to which the power is applied. The journals of the grooved pulleys or wheel O work in bearings in the frames or brackets L P attached to the frame of the building or hoistway. To the side of the pulley or wheel O is attached, or upon it is formed, a smooth-faced pulley, flange, or shoulder, Q, to receive the brake-strap R, the middle and lower part of which is pivoted to a bracket or support, S, attached to the lower part of the frame or bracket P. The ends of the strap R are pivoted to the lever T upon the opposite side of its pivoting-point, as shown in Fig. 2. The lever T is pivoted to the frame P, and to its upper end are attached the ends of two ropes, U V. The rope U passes over a guide-pulley, *w'*, and extends down through or near the hoistway, so that it may be conveniently reached and operated by the operator to apply the brake from any floor of the building, or from the platform or cage B at any point of its movement. The other rope, V, passes over a guide-pulley, $v'$, and has a weight, W, attatched to it sufficient to draw back the lever T and loosen the brake-strap R whenever the said lever is released. X is a curved ratchet-pawl, which is pivoted to the frame or bracket P, and against the teeth of which rests a pin, $t'$, attached to the lever T so that the said lever may be held by the said pawl into any position in which it may be moved in applying the brake-strap. To the other end of the pawl X is attached one end of a rope or cord, Y, which extends down along the side of or near the brake-cord U, so that the operator, by pulling upon the cord Y, may at any time release the lever T, and allow the brake-strap R to be loosened by the weight W.

By connecting the counterpoise with the cage or platform by a single or continuous rope coiled around an intermediate drum, as herein shown and described, a saving of one-half the rope usually employed for this purpose is effected.

What I claim, and desire to secure by Letters Patent, is—

1. In combination with the cage or platform of an elevator and counterpoise, an intermediate drum to which the power is applied, and a single continuous rope extending from the cage to and around the drum in coils, and thence to the idler H, from which point it passes over the pulley I to the counterpoise, to which it is attached, whereby one rope is enabled to perform the duty usually requiring two.

2. In combination with the cage or platform of an elevator, a counterpoise and single continuous rope, an intermediate drum, G, an idler, H, and swiveling-pulley I, substantially as set forth.

3. The slack-weight J and its continuous rope D, swiveled pulley I, idler H, and drum G, all combined and arranged with the cage B, as and for the purpose specified.

4. In combination with pivoted brake-strap R, arranged on shoulder Q of wheel O, the lever T $t'$, pawl X, ropes U V Y, and weight W, as and for the purpose specified.

In testimony whereof I have hereunto signed my name in presence of two subscribing witnesses.

GUSTAVUS C. TIMPE.

Witnesses:
J. F. LEHRMANN,
F. W. DECOPPET.